(No Model.)
E. H. LUNKEN.
CHEWING GUM BOX.
No. 599,945. Patented Mar. 1, 1898.
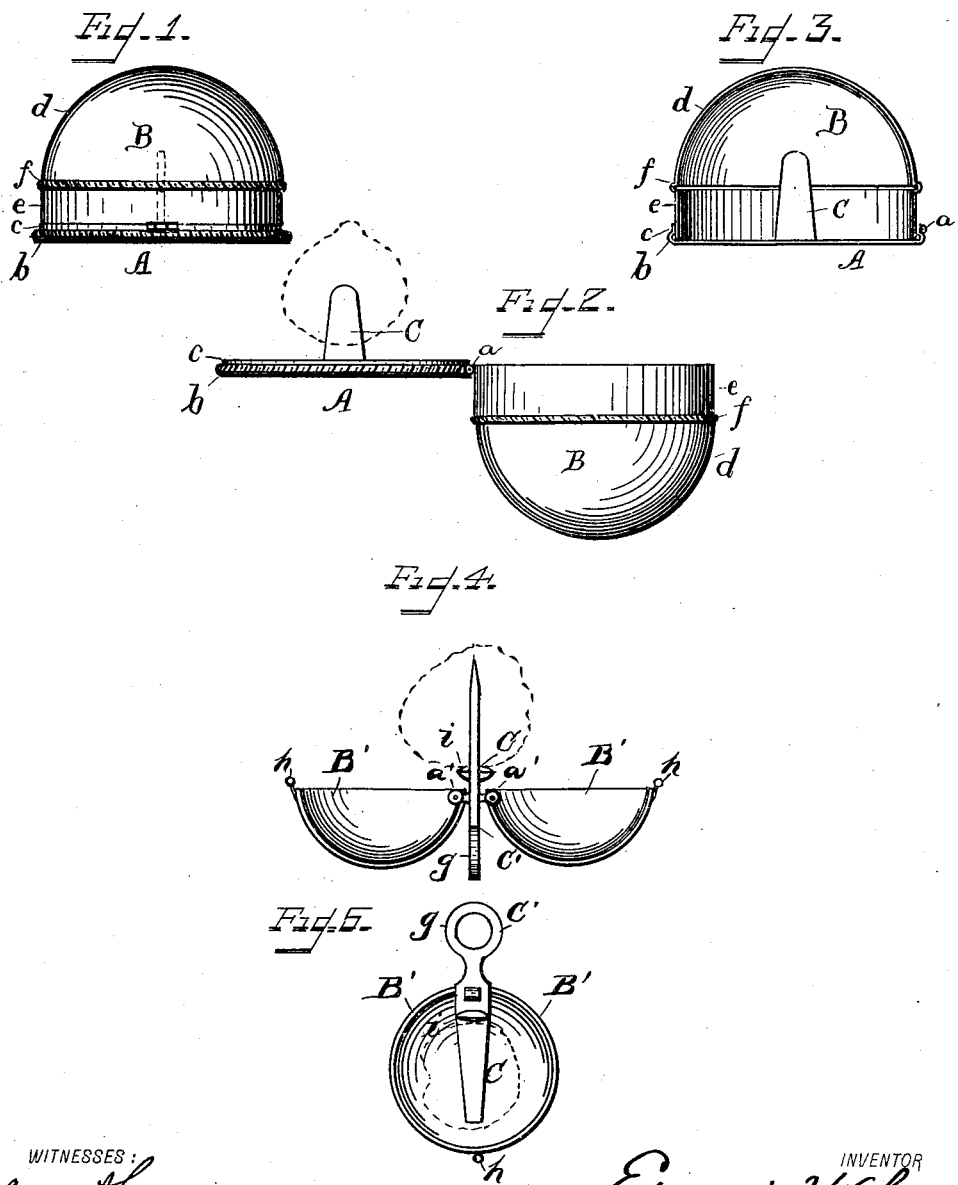

UNITED STATES PATENT OFFICE.

EDMUND H. LUNKEN, OF DENVER, COLORADO.

CHEWING-GUM BOX.

SPECIFICATION forming part of Letters Patent No. 599,945, dated March 1, 1898.

Application filed September 28, 1897. Serial No. 653,304. (No model.)

*To all whom it may concern:*

Be it known that I, EDMUND H. LUNKEN, a citizen of the United States, residing at Denver, in the county of Arapahoe and State of Colorado, have invented certain new and useful Improvements in Chewing-Gum Boxes, of which the following is a full, clear, and exact description, reference being had to the accompanying drawings, forming part of this specification.

My invention has for its object the provision of a simple, neat, and convenient box or receptacle for the reception and preservation of chewed gum and similar articles, adapted to be carried in the pocket or hung on a chain and serve to hold the piece of chewed gum upon a stud or pin within the box and protect it from dirt until desired for further use, such provision being made in the construction of the box or receptacle that when it is opened the stud or pin upon which the gum is impaled is brought into position to enable the holder of the box to readily strip off the gum with his teeth without any obstruction being accorded by the box, and in like manner when he has finished chewing the gum for a time to again open the box and reimpale the gum upon the stud or pin with his mouth, all as hereinafter more fully explained in connection with the accompanying drawings.

The novelty of my invention will be hereinafter more fully set forth, and specifically pointed out in the claims.

In the accompanying drawings, Figure 1 is a side elevation of one form of my box closed, the gum-retaining pin being represented in dotted lines. Fig. 2 is a corresponding view of the same form of box inverted and open in position to place the gum upon the stud or pin or remove it therefrom with the mouth, the gum being represented in dotted lines. Fig. 3 is a transverse side elevation of Fig. 1 on the dotted line $x$ $x$. Fig. 4 is a transverse sectional view of another form of box in its opened position. Fig. 5 is one-half of the same box containing the stud and attaching-ring in the closed position of the box.

The same letters of reference are used to indicate identical parts in all the figures.

In Figs. 1, 2, and 3 the box is made of tin or other suitable material and is preferably circular in horizontal section. It is composed of a bottom or base A and a top or lid B, preferably hinged to the bottom A at one side, as at $a$, to permit the top B to be swung open, as shown in Fig. 2. The periphery of the base or bottom A is preferably formed into a bead $b$, having a knurled or milled surface and provided with an upwardly-extending circular flange $c$, within which the lower edge of the top B snugly fits when the box is closed. The top or lid B of the box preferably consists of two portions $d$ $e$, formed of the same integral piece of metal, but separated by a circumferential bead $f$, corresponding to the one $b$ around the periphery of the base or bottom A. The portion of the top B below the bead $f$ constitutes approximately one-half of a hollow sphere.

The knurled beads $b$ $f$ upon the base A and top B of the box, respectively, afford convenient means for opening and closing the box, since by grasping the bottom A in one hand and the bead $f$ of the top B with the other the box may be readily opened and closed. When closed, the engagement of the flange $c$ of the bottom A with the lower edge of the portion $e$ of the lid is sufficient to retain the lid in closed position. This flange $c$ may be made either to fit around the exterior of the lower edge of the lid, as shown, or to fit snugly within the same, as desired.

Secured to and projecting upward from the center of the base A of the box is a stud C, adapted to receive the piece of chewed gum and support the same and hold it out of contact with the inner surface of the box, as indicated by the dotted lines in Figs. 3 and 4. This stud C is preferably formed of a thin piece of metal, as shown in the cross-section of it in Fig. 1, to facilitate the removal of the piece of gum with the teeth.

In Figs. 4 and 5 the box is constructed of two hollow spheroidal pieces B', hinged, as at $a'$, to the stud C, which has an outward extension C', with an attaching loop or ring $g$, by which the box when closed may be suspended from a cord or chain. The two halves of the box come snugly together when closed and may be provided with any suitable catch. In this instance I have shown small knobs $h$, engaging each other in the well-known manner of purse-fastenings. In this last construction, as clearly illustrated in Fig. 4, when the box is opened the stud containing the gum is brought into position to be readily stripped off or slipped on by the mouth without obstruction by the box, and the stud is preferably provided with a shoulder or base $i$ to prevent the gum from being pressed too far down upon the stud.

While I have shown two forms of boxes embodying my invention, it is to be understood that in its broad sense the invention is not to be limited to the exterior shape of the box, the only essential requisites of which are that it shall be a two-part box adapted to be opened and closed and having upon its interior a gum-holding stud or pin which when the box is opened is fully exposed without obstruction to the action of the mouth and teeth both in applying and removing the gum.

My improved chewing-gum box is particularly adapted for the use of children, who are in the habit of preserving their pieces of chewed gum for successive use, and furnishes a very convenient and efficient means for carrying the same and protecting it from dirt.

If desired, the hinge $a$ of Figs. 1, 2, and 3 may be omitted and the lid of the box consist simply of a cap adapted to fit over and be held by the flange upon the base and to be entirely removed therefrom to give access to the interior of the box.

Having thus fully described my invention, I claim—

1. A two-part box for chewing-gum, provided on its interior with a gum-retaining stud, so arranged that when the box is opened the stud is in position to enable the gum to be readily pressed on or stripped off the stud by the teeth, substantially as described.

2. The herein-described chewing-gum box, composed of the base or bottom, A, the top or lid, B, and the stud, C, for supporting the chewed gum, said stud projecting from the bottom, A, a sufficient distance to permit the ready removal of the gum with the mouth, without obstruction by the bottom or top of the box, as and for the purpose set forth.

3. The herein-described chewing-gum box, composed of the base or bottom, A, the top or lid, B, hinged to the bottom, A, and the flat stud, C, projecting from the center of the bottom, A, in a plane transverse to the axis of the hinge between the bottom, A, and lid, B, and of sufficient length to permit the ready removal of the gum with the mouth without obstruction from the bottom, A, or the lid, B, as and for the purpose set forth.

4. The herein-described chewing-gum box, composed of the base or bottom, A, provided around its edge with the circular flange, $c$, the lid or top, B, hinged to the bottom, A, and adapted to coöperate at its lower edge with the flange, $c$, upon the base, A, to hold the box closed, and the stud, C, projecting from the center of the base, A, a sufficient distance above the flange, $c$, to permit the ready removal of the gum with the mouth without obstruction by the flange, as and for the purpose set forth.

5. The herein-described chewing-gum box, composed of the base or bottom, A, having the knurled bead, $b$, around its edge and provided with a circular flange, $c$, the lid or top, B, composed of the portions, $d$, $e$, separated by the bead, $f$, and adapted to coöperate at its lower edge with the flange, $c$, upon the base, A, to hold the box closed, and the stud C projecting from the center of the base, A, a sufficient distance to permit the ready removal of the gum with the mouth without obstruction by the flange, $c$, upon the base, A, as and for the purpose set forth.

EDMUND H. LUNKEN.

Witnesses:
ISHAM R. HOWZE,
HELEN MORRILL.